United States Patent
Ronström

(10) Patent No.: US 6,275,823 B1
(45) Date of Patent: Aug. 14, 2001

(54) METHOD RELATING TO DATABASES

(75) Inventor: Ulf Mikael Ronström, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/358,432

(22) Filed: Jul. 22, 1999

(30) Foreign Application Priority Data

Jul. 22, 1998 (SE) .................................................... 9802598

(51) Int. Cl.⁷ .................................................... G06F 17/30
(52) U.S. Cl. .................................. 707/8; 707/8; 707/103; 710/200; 709/105; 709/201
(58) Field of Search .................................. 707/8, 10, 103; 710/200; 709/102, 105, 106, 107, 201; 714/19

(56) References Cited

U.S. PATENT DOCUMENTS

| | | | |
|---|---|---|---|
| 4,318,182 * | 3/1982 | Bechman et al. | 709/105 |
| 4,819,159 * | 4/1989 | Shipley et al. | 714/19 |
| 5,193,188 * | 3/1993 | Franaszek et al. | 707/8 |
| 5,285,528 * | 2/1994 | Hart et al. | 710/200 |
| 5,440,743 | 8/1995 | Yokota et al. | 710/200 |
| 5,764,976 | 6/1998 | Hsiao | 707/8 |
| 5,784,623 | 7/1998 | Srinivasan | 710/200 |
| 5,940,828 * | 8/1999 | Anaya et al. | 707/8 |
| 6,195,676 * | 2/2001 | Spix et al. | 709/107 |

FOREIGN PATENT DOCUMENTS

| | | |
|---|---|---|
| 84110013 | 3/1989 | (EP) . |
| 0 433 882 A2 | 6/1991 | (EP) . |
| 0 618 532 A2 | 10/1994 | (EP) . |
| 0 716 377 A2 | 6/1996 | (EP) . |

OTHER PUBLICATIONS

Kshemkalyani, Ajay et al., "A One–Phase Algorithm to Detect Distributed Deadlocks in Replicated Databases", IEEE Transactions on Knowledge And Data Engineering, vol. 11, No. 6, Nov./Dec. 1999, pp. 880–895.*

(List continued on next page.)

Primary Examiner—Hosain T. Alam
Assistant Examiner—Shahid Alam
(74) Attorney, Agent, or Firm—Burns, Doane, Swecker & Mathis, L.L.P.

(57) ABSTRACT

The present invention relates to a method of handling the risk of a deadlock between simultaneous transactions T1, T2 in a database 1. The method is based on allocating to respective objects 01, 02 in the database 1 a lockout queue L1, L2 in which transactions T1, T2, T3, . . . , T8 that request access to an object 01, 02 are placed to await the access to said object of a preceding transaction. The handling procedure comprises going through, or perusing, the lockout queues L1 belonging to different objects 01 to detect so-called locking transactions T1 that can cause a deadlock and, subsequent to detection, comparing said locking transaction with other transactions T2, T6, T1. T7, T8 in other lockout queues L2 therewith enabling the risk of deadlock between a first and a second transaction T1, T2 that have both requested access to the same first and second object 01, 02 to be detected. Combinations of transactions that are ongoing or active in the database and that, according to said comparison, can cause a deadlock are divided into locking and non-locking combinations respectively. Solely the detection of a locking combination will cause further action to be taken.

19 Claims, 8 Drawing Sheets

OTHER PUBLICATIONS

Park, Young C. et al., "A deadlock Detection and Resolution Algorithm for Sequential Transaction Processing with Multiple Lock Modes", Proceedings of the 15th Annual International Computer Software & Applications Conference, Sep. 11–13, 1991, pp. 70–77.*

Yeung, Chim–Fu et al., "A New Deadlock Detection Algorithm for Distributed Real–Time Database Systems", Proceedings of the 14th Symposium on Reliable Distributed Systems, Sep. 13–15, 1995, pp. 146–153.*

"*Application and Theory of Petri Nets 1998*"; 19$^{th}$ International Conference (Lisabon, Portugal), ICATPN '98 ; Jun. 1998.

"*Two–P{hase Deadlock Detection Algorithm*"; IEEE Transactions on Computers; vol. 37, No. 11, pp. 1454–1458; A. K. Elmagarmid and A. K. Datta; Nov. 1988.

"Principles of Distributed Database Systems"; Ch. 11, pp. 310–316; M. Tamer Özsu and Patrick Valduriez; 1991.

International Search Report Date of Completion: Jun. 16, 1999; Date of Mailing: Jun. 23, 1999.

* cited by examiner

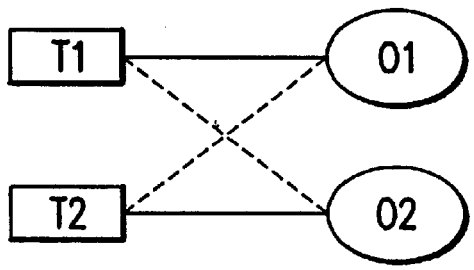
FIG.1
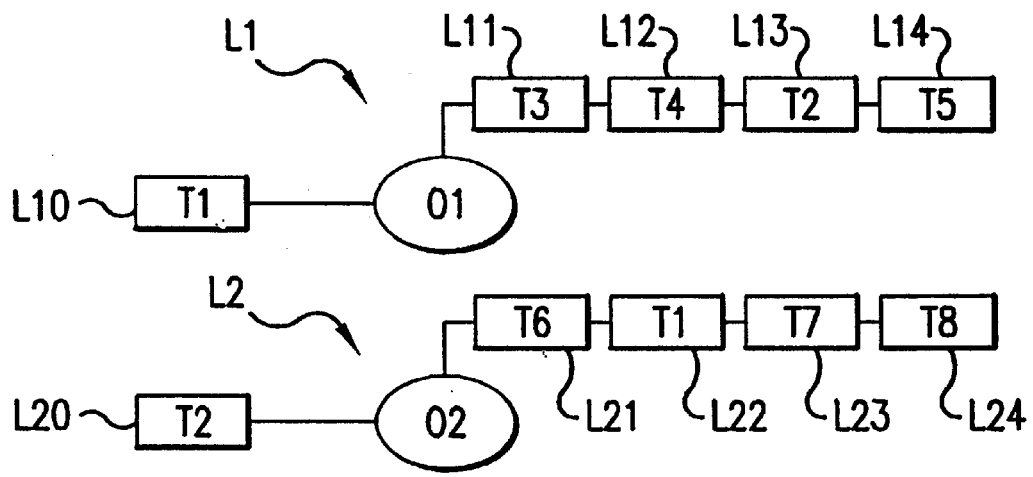
FIG.2
FIG. 3A
FIG. 3B

FIG. 4A

|    | CT | DT |
|----|----|----|
| CT | –  | X  |
| DT | X  | X  |

FIG. 4B

|    | CT | DT |
|----|----|----|
| CT | –  | X  |
| DT | X  | X  |

FIG. 5A

|     | ACT | ADT | BCT | BDT |
|-----|-----|-----|-----|-----|
| ACT | –   | –   | –   | –   |
| ADT | –   | –   | –   | –   |
| BCT | –   | –   | –   | X   |
| BDT | –   | –   | X   | X   |

FIG. 5B

|     | ACT | ADT | BCT | BDT |
|-----|-----|-----|-----|-----|
| ACT | –   | –   | –   | –   |
| ADT | –   | –   | –   | –   |
| BCT | –   | –   | –   | X   |
| BDT | –   | –   | X   | X   |

FIG. 5C

|     | ACT | ADT | BCT | BDT |
|-----|-----|-----|-----|-----|
| ACT | –   | –   | –   | –   |
| ADT | –   | –   | –   | –   |
| BCT | –   | –   | –   | X   |
| BDT | –   | –   | X   | X   |

|     | CET | CFT | DET | DFT |
|-----|-----|-----|-----|-----|
| CET | –   | –   | –   | X   |
| CFT | –   | –   | X   | X   |
| DET | –   | X   | –   | X   |
| DFT | X   | X   | X   | X   |

FIG. 8A

|     | CET | CFT | DET | DFT |
|-----|-----|-----|-----|-----|
| CET | –   | –   | –   | X   |
| CFT | –   | –   | X   | X   |
| DET | –   | X   | –   | X   |
| DFT | X   | X   | X   | X   |

FIG. 8B

|     | CET | CFT | DET | DFT |
|-----|-----|-----|-----|-----|
| CET | –   | –   | –   | X   |
| CFT | –   | –   | X   | X   |
| DET | –   | X   | –   | X   |
| DFT | X   | X   | X   | X   |

FIG. 8C

|     | CET | CFT | DET | DFT |
|-----|-----|-----|-----|-----|
| CET | –   | –   | –   | X   |
| CFT | –   | –   | X   | X   |
| DET | –   | X   | –   | X   |
| DFT | X   | X   | X   | X   |

FIG. 8D

|      | ACT | ADT | BCET | BCFT | BDET | BDFT |
|------|-----|-----|------|------|------|------|
| ACT  | –   | –   | –    | –    | –    | –    |
| ADT  | –   | –   | –    | –    | –    | –    |
| BCET | –   | –   | –    | –    | –    | X    |
| BCFT | –   | –   | –    | –    | X    | X    |
| BDET | –   | –   | –    | X    | –    | X    |
| BDFT | –   | –   | X    | X    | X    | X    |

FIG. 9A

|      | ACT | ADT | BCET | BCFT | BDET | BDFT |
|------|-----|-----|------|------|------|------|
| ACT  | –   | –   | –    | –    | –    | –    |
| ADT  | –   | –   | –    | –    | –    | –    |
| BCET | –   | –   | –    | –    | –    | X    |
| BCFT | –   | –   | –    | –    | X    | X    |
| BDET | –   | –   | –    | X    | –    | X    |
| BDFT | –   | –   | X    | X    | X    | X    |

FIG. 9B

|      | ACT | ADT | BCET | BCFT | BDET | BDFT |
|------|-----|-----|------|------|------|------|
| ACT  | –   | –   | –    | –    | –    | –    |
| ADT  | –   | –   | –    | –    | –    | –    |
| BCET | –   | –   | –    | –    | –    | X    |
| BCFT | –   | –   | –    | –    | X    | X    |
| BDET | –   | –   | –    | X    | –    | X    |
| BDFT | –   | –   | X    | X    | X    | X    |

FIG. 9C

|      | ACT | ADT | BCET | BCFT | BDET | BDFT |
|------|-----|-----|------|------|------|------|
| ACT  | –   | –   | –    | –    | –    | –    |
| ADT  | –   | –   | –    | –    | –    | –    |
| BCET | –   | –   | –    | –    | –    | X    |
| BCFT | –   | –   | –    | –    | X    | X    |
| BDET | –   | –   | –    | X    | –    | X    |
| BDFT | –   | –   | X    | X    | X    | X    |

FIG. 9D

|      | ACT | ADT | BCET | BCFT | BDET | BDFT |
|------|-----|-----|------|------|------|------|
| ACT  | –   | –   | –    | –    | –    | –    |
| ADT  | –   | –   | –    | –    | –    | –    |
| BCET | –   | –   | –    | –    | –    | X    |
| BCFT | –   | –   | –    | –    | X    | X    |
| BDET | –   | –   | –    | X    | –    | X    |
| BDFT | –   | –   | X    | X    | X    | X    |
FIG. 9E
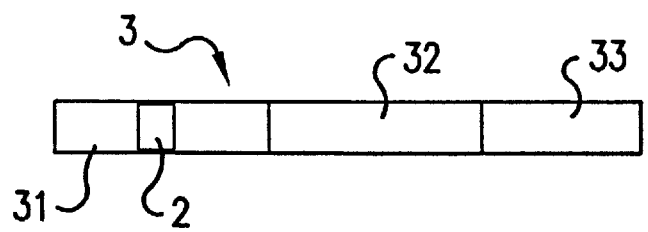
FIG. 10
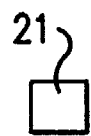
FIG. 11
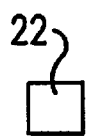
FIG. 12
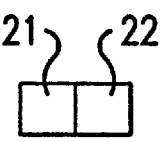
FIG. 13
FIG. 14

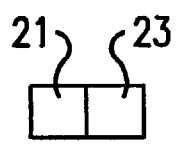 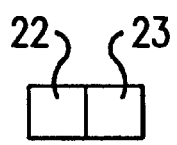 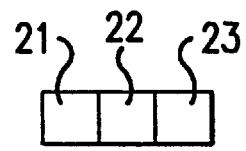
FIG. 15  FIG. 16  FIG. 17
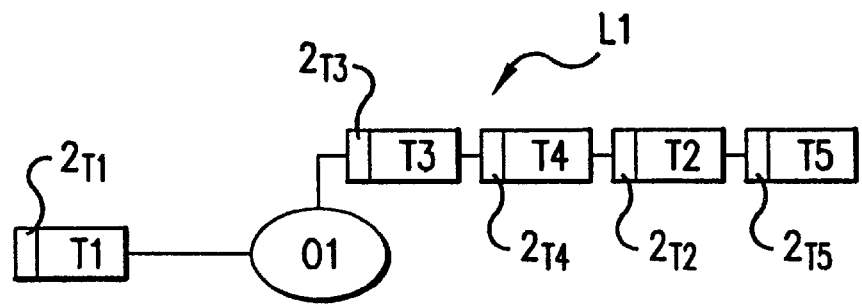
FIG. 18
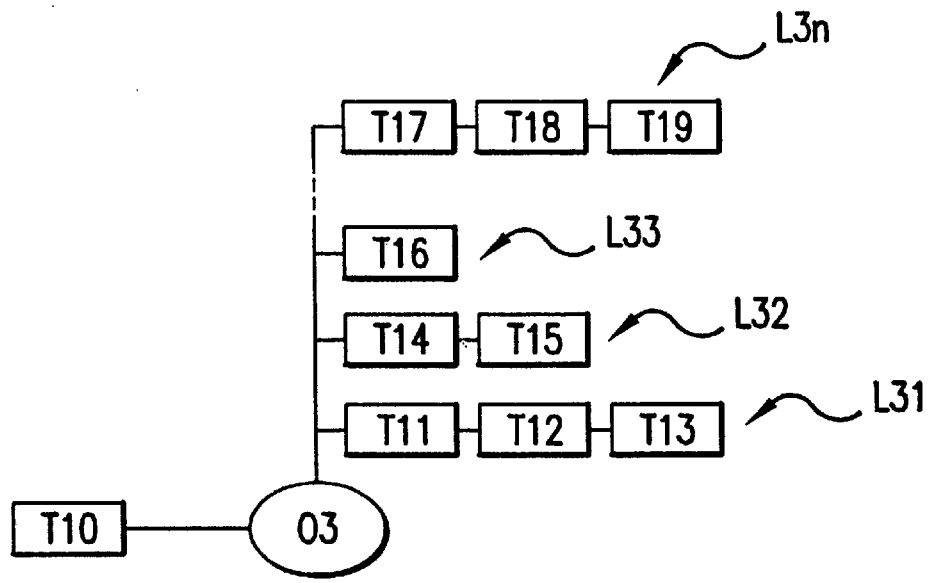
FIG. 19

METHOD RELATING TO DATABASES

FIELD OF INVENTION

The present invention relates to a method of handling the risk of deadlock between mutually simultaneous transactions in a database.

DESCRIPTION OF THE BACKGROUND ART

When handling transactions in databases, it has long been known to allow a transaction that has been denied access to an object because of a lock from another transaction to wait until the locked object becomes avaliable by virtue of the completion of the transaction that locked the object.

When each of two transactions sets a lock on an object to which the other of said two transactions has requested access, each transaction must wait until access is available and none of the transactions will release its lock, therewith resulting in a deadlock.

A deadlock can be avoided or prevented in different ways.

It is known that respective objects have at least one lockout queue or line, in which the transactions desiring access to the object are placed. The transactions awaiting access to an object are apparent from the a e queue.

This lockout queue can be implemented in different ways, for instance in the form of a list or hash-table, and respective objects may be allotted several lockout queues where different types of locks are placed in different queues.

For the sake of simplicity, the majority of the embodiments of the present invention include only one lockout queue for respective objects. The person skilled in this art, however, will understand that the present invention can also be implemented when several lockout queues are used.

The risk of a deadlock happening can be detected, by comparing the lockout queues for different objects. This comparison involves comparing all transactions present in an object lockout queue with those transactions present in the lockout queues for other objects in the database. If this comparison reveals that two transactions desire access to two (or more) common objects, then the risk of deadlock has been detected.

This may not necessarily mean that the situation will develop into a deadlock, since different time aspects with respect to when the different objects will be accessed by respective transactions, and the type of lock that is set on respective transactions on said different objects will decide whether or not the situation will develop into a deadlock situation.

The time aspect implies that a waiting time may depend on reasons other than a given transaction having caused a deadlock, such as a transaction must await access because of a deadlock caused by completely different transactions, or because of the time taken to carry out preceding transactions in the queue, or because the own access takes time to carry out, without resulting in deadlock.

One type of lock enables access to be achieved as a purely reading transaction, wherewith this transaction will set a so-called divided lock on the object and the object will therefore still be available for reading other transactions.

When the danger of a deadlock is detected, the danger can be avoided by executing different procedures.

These procedures can be divided mainly into two groups, deadlock detection and deadlock avoidance.

When deadlock is detected there is initiated a process in which it is established whether or not deadlock is actually possible, prior to one of the involved transactions being aborted.

A deadlock is avoided by aborting one of the involved transactions immediately the risk of deadlock is detected, without actually establishing whether or not a deadlock exists.

Different methods are known whereby it can be decided which transaction shall be permitted to continue and which transaction shall be aborted. Normally, transactions of higher priorities are given precedence over transactions of lower priority.

When a deadlock occurs between two transactions of mutually the same priority, the older transaction is continued and the younger transaction is aborted, providing that it is possible to decide which transaction is the youngest and which transaction is the oldest, for instance through time stamps.

The present invention is not dependent on the method used when detecting the risk of a deadlock. The implementation of such a method will not therefore be described in this document. Thus, reference is made in the following description solely to the implementation of a further action or procedure subsequent to detecting the risk of a deadlock.

Various methods of implementing deadlock detection are described, e.g., in publications EP-A2-0 433 882, U.S. Pat. No. 5,440,743, SE-T3-0 135 173, and Two-phase Deadlock Algorithm, by A. K. Elmagarmid and A. K. Datta, IBREE Transactions on Computers, Vol. 37, No. 11, November 1998. These applications teach various methods of not only detecting the possible risk of a deadlock but also of detecting whether or not a deadlock actually exists.

It is also known to place all objects in a database in a numbered order relative to each other.

This can be achieved by placing all objects consecutively in a table, one after the other, even when the objects may be placed physically in another order in practice but interlinked in the consecutive order, for instance via a linked list.

For instance, when all tables in a database are given different numbers, table 1, table 2, table 3 and so on, all objects in the total database can be considered to lie in a number order relative to each other, in other words in the consecutive order in the table in combination with the table order.

A database organisation of this kind enables deadlock between two transactions to be prevented, and therewith completely avoided.

This is possible by allowing solely those transactions that are active or ongoing in the database to access relevant objects in number order. If such is the case, a first transaction can never lock a first object and then "back out" in order to access an earlier object in the number order, a second object, that has already been locked by a second transaction that, in turn, desires access to the first object, when the second object lies in front of the first object in the aforedescribed number order.

In this case, waiting times may possibly occur, i.e. "standard" locking, but never a deadlock.

It will be observed that in the case of a database where each object is allotted a specific order in accordance with the aforegoing, transactions that are implemented in accordance with this order and transactions that pay no regard to said order can both be implemented simultaneously. In order to distinguish between these transactions, transactions that pay regard to such an ordered list are described in the following as "strictly growing transactions" while transactions that pay no regard to such an ordered list are referred to as "nonstrictly growing transactions".

In a combination of the two methods, deadlock can occur immediately one transaction is a non-strictly growing transaction, but never between two strictly growing transactions.

It can also be mentioned that the difficulties encountered with monitoring a database with respect to deadlock are particularly significant in distributed databases.

The reader is referred to Principles of Distributed Database Systems by M. Tamer özsu and Patrick Valduriez, ISBN 0-13-691643-0, for further information concerning database handling in general and deadlock and the handling of deadlock situations in particular.

SUMMARY OF THE INVENTION

Technical Problems

When considering the earlier standpoint of techniques as described above, it will be seen that a technical problem resides in the ability to reduce considerably the execution capacity required for monitoring the risk of deadlock in relation to the capacity required in the case of known technology, while maintaining security against deadlock between simultaneous transactions in the database.

Another technical problem resides in the ability to categorise transactions as so-called locking transactions, so as to enable locking and non-locking combinations of transactions to be readily distinguished from each other, by observing the category to which the concerned transactions belong.

Another technical problem is one of enabling combinations of transactions that are liable to cause a deadlock to be distinguished readily from combinations of transactions which although requesting access to the same objects will not cause a deadlock, when comparing transactions present in different lockout queues.

Still another technical problem is one of distinguishing between transactions that cannot cause a deadlock regardless of any other transaction with which they may be combined and transactions that are able to result in deadlock in combination with certain other transactions, when going through a lockout queue.

Yet another technical problem is one of being able to distinguish between transactions that are unable to result in a deadlock situation in combination with certain other transactions and transactions that can cause a deadlock situation in combination with other transactions, when going through a lockout queue.

Still another technical problem is one of enabling combinations of transactions that cause a deadlock to be detected in a simple manner in conjunction with such transactions.

Another technical problem is one of enabling strictly growing transactions and non-strictly growing transactions to be used within one and the same database, and to be able to distinguish in said database between combinations of transactions that can cause a deadlock from combinations of transactions that are unable to cause a deadlock situation, regardless of whether the transactions are strictly growing or non-strictly growing.

Another technical problem is one of enabling the provision of different categorisations that depend on the particular attention that shall be paid to a transaction, such as attention to reading and writing transactions, simple and complex transactions, strictly growing and non-strictly growing transactions, where such attention can be paid individually or in selective combinations.

Yet another technical problem is one of enabling transactions to be labelled or marked so that they can be referred unambiguously to any category of transactions, whereby locking transaction combinations can be readily distinguished from non-locking transaction combinations.

Still another technical problem is one of enabling respective transactions in a lockout queue to be referred directly to the category concerned, in a simple and effective manner.

Solution

With the intention of providing a solution to one or more of the aforesaid technical problems, the present invention takes as its starting point a method of dealing with the risk of deadlock between simultaneous transactions in a database, in which respective database objects are allocated at least one lockout queue, or line, in which transactions that request access to an object are placed in queues to await the access of preceding transactions to said object.

The handling procedure includes going through the transactions in lockout queues belonging to different objects, which shows whether or not there is a risk of a first transaction causing deadlock with a second transaction when said transactions both request access to the same first and second objects.

On the basis of such a method, it is particularly proposed in accordance with the invention that the transactions that are active or ongoing in the database and capable of causing deadlock in combination with other transactions are characterised as locking transactions, that combinations of transactions active or ongoing in the database are divided into locking and non-locking combinations, and that only a detected locking combination results in further action.

Thus, when a non-locking combination is detected no further action is required on the part of the database. Execution work involving evaluation of a potential deadlock and a follow-up of these transactions need not be carried out, therewith reducing the execution work required in handling the risk of a deadlock situation.

There are many different ways of categorising transactions active within the database, for evaluating the risk of a deadlock.

One way is to divide the transactions into simple transactions, which are transactions that solely access one object in the database, and complex transactions, which are transactions that access two or more objects in the database.

In this case, complex transactions are so-called locking transactions, a locking combination is comprised of two complex transactions, and a non-locking combination is comprised of a single transaction and some other transaction, regardless of whether this other transaction is a simple or complex transaction.

Transactions can also be divided into writing and reading transactions respectively, where writing transactions are so-called locking transactions, where a locking combination is comprised of a writing transaction and some other transaction regardless of whether this other transaction is a writing transaction or a reading transaction, and where a non-locking combination is comprised of two reading transactions.

The present invention also enables handling of a potential deadlock situation in a database in which both strictly growing and non-strictly growing transactions are simultaneously active or ongoing in the database.

According to the present invention, non-strictly growing transactions in such a database are so-called locking transactions, a locking combination is comprised of non-strictly growing transactions and some other transaction regardless of whether this other transaction is strictly growing or non-strictly growing, and a non-locking combination is comprised of two strictly growing transactions.

When handling a potential deadlock situation, it is possible in accordance with the present invention to take into account any arbitrary combination of the factors simple and complex transactions, reading and writing transactions and strictly growing and non-strictly growing transactions respectively. Those combinations that can result in locking and non-locking combinations of transactions, and how, will be made apparent in the following description of preferred embodiments.

The combination that is most advantageous in a given case may depend on the specific database in which the present invention shall be implemented.

According to the present invention, the transactions active in the database, i.e. under implementation, are marked, or labelled, in accordance with the category to which they belong.

This is effected by allotting to respective transactions a so-called locking flag that is adapted to show whether or not the transaction can result in a deadlock in combination with another transaction.

This locking flag is allocated bits which are adapted to show whether the transaction is a simple or complex transaction, a reading or writing transaction, or a strictly growing or non-strictly growing transaction, all in accordance with the combinations used in the database concerned.

The present invention also enables the locking flag belonging to the transactions waiting in a lockout queue to be shown in the queue so as to enable the category affiliation to be seen directly in said queue, therewith further simplifying the comparison of lockout queues belonging to different objects.

According to the invention, the category affiliation can also be shown by allocating several lockout queues to respective objects, where the number of lockout queues for respective objects equals the number of categories of transactions that are active in the database, and where a queue affiliation also shows the category affiliation of a transaction.

Advantages

The inventive method provides the advantages of greatly reducing the capacity required to execute handling of a potential deadlock situation between simultaneous transactions in relation to the capacity required by known techniques, while retaining security with respect to deadlock between simultaneous transactions in the database.

The present invention also enables both strictly growing and non-strictly growing transactions to be active simultaneously in one and the same database, where this combination enables the problems surrounding deadlock situations to be handled very efficiently.

The inventive method can also be applied to particular advantage in a distributed database.

The primary characteristic features of an inventive method are set forth in the characterising clause of the accompanying claim 1.

BRIEF DESCRIPTION OF THE DRAWINGS

The present invention will now be described in more detail with reference to an inventive method by way of example only, and also with reference to the accompanying drawings, in which FIG. 1 is a schematic illustration of a deadlock between a first and a second transaction;

FIG. 2 is a schematic illustration of two objects with associated lockout queues in a first situation;

FIGS. 3a and 3b are respective illustrations of a matrix in which locking and non-locking combinations of transactions in accordance with a first embodiment can be derived;

FIGS. 4a and 4b are respective illustrations of a matrix wherein locking and non-locking combinations of transactions in accordance with a second embodiment can be derived;

FIGS. 5a, 5b and 5c are respective illustrations of a matrix in which locking and non-locking combinations of transactions according to a third embodiment can be derived;

FIGS. 6a and 6b are respective illustrations of a matrix I which locking and non-locking combinations of transactions can be derived in accordance with a fourth embodiment;

FIGS. 7a, 7b and 7c are respective illustrations of a matrix in which locking and non-locking combinations of transactions can be derived in accordance with a fifth embodiment;

FIGS. 8a, 8b, 8c and 8d are respective illustrations of a matrix in which locking and non-locking combinations of transactions can be derived in accordance with a sixth embodiment;

FIGS. 9a, 9b, 9c, 9d and 9e are respective illustrations of a matrix in which locking and non-locking combinations of transactions can be derived in accordance with a seventh embodiment;

FIG. 10 is a schematic illustration of a transaction affiliated locking flag which shows the category affiliation of the transaction concerned;

FIGS. 11–17 are respective schematic illustrations of different embodiments of a locking flag according to FIG. 10;

FIG. 18 illustrates an example of a lockout queue in accordance with the present invention; and FIG. 19 illustrates schematically an object that has a plurality of different lockout queues, and shows the presentation of a category affiliation for transactions that wait in respective lockout queues.

DETAILED DESCRIPTION OF EMBODIMENTS AT PRESENT PREFERRED

FIG. 1 illustrates two mutually different transactions active in a common database 1, i.e. a first transaction T1 and a second transaction T2. The database includes a number of different objects, wherewith the Figure shows a first object 01 and a second object 02.

The first transaction T1 has access to the first object 01, as shown by a full line. Correspondingly, the second transaction T2 has access to the second object 02.

The first transaction T1 also requests access to the second object 02, as shown with a broken line, and the second transaction T2 requests access to the first object 01, as also shown with a broken line.

In the illustrated example, the first transaction is a writing transaction, or a changing transaction, meaning that no other transactions are offered access to the first object 01 until the first transaction T1 is finished with the first object 01. Because the first transaction is a writing transaction, the transaction cannot be given access to any other object, such as the second object 02, while some other transaction, such as the second transaction T2, has access to this object. The two transactions T1, T2 will therefore wait for each other and the lock cannot be released. This is a deadlock situation.

This illustrates that a deadlock can occur between two different transactions. It should be mentioned, however, that a deadlock can also occur between three or more transactions where, e.g., a first transaction waits for a second transaction, said second transaction waits for a third transaction, and said third transaction waits for the first transaction. In order to simplify the following description by way of example, only the relationship between two different transactions and the manner in which these transactions can cause a deadlock situation will be described. The person skilled in this art, however, will realise how the present invention can be applied in general situations in which more than two transactions can mutually lockout each other.

FIG. 2 shows respective objects 01, 02 allocated to a respective lockout queue L1, L2, in which said transactions wait for access to the object.

The queue L1 includes a number of different positions L1, L11, L12, L13, L14, where one position L10 shows the transaction T1 that has access to the object 01 at that moment in time, with further transactions T3, T4, T2, T5 waiting in other positions L11, L12, L13, L14. In the illustrated case, the second transaction T2 is listed in the third queue position L13 for the first object 01, this second transaction also being the transaction that accesses the second object 02 at that moment in time. Correspondingly, the first transaction T1 is shown in the second position L22 of the lockout queue L2 for the second object 02.

The danger of a deadlock occurring between the first transaction T1 and the second transaction T2 can be predicted before the situation actually results in a deadlock. A comparison of the queues L1, L2 for access to the two objects 01, 02 will show that the transactions T1, T2 which at that moment have access to a respective object 01 or 02 also wait in the queue for access to the other of said objects.

A queue comparison begins with comparing the content of, or the transaction located in, the first position L10 of a queue L1 with the contents of the positions in lockout queues belonging to all second objects in the database. Such comparisons are continuously ongoing and demand a certain execution capacity on the part of the database.

Although the situation shown in FIG. 2 has possibly not yet developed into a deadlock situation, the danger of a deadlock has been detected and it is possible to act in accordance with the detected deadlock situation or to avoid deadlock in accordance with known technology. However, the present invention does not rely on the process employed when the danger of deadlock has been detected, and consequently such procedures will not be described in this document.

A detected risk a possible deadlock not necessarily result in a deadlock, since it is not certain that the transactions T1, T2 concerned will lock the object 01, 02 against each other or against some other transaction. For instance, the transactions may be reading transactions and therewith permit another reading transaction simultaneous access to the object.

The present invention proposes a method of handling the risk of a deadlock between simultaneous transactions in a database, comprising the step of going through the lockout queue L1 for the first object 01 in which different transactions T1, T3, T4, T2, T5 are located in positions L10, L11, L12, L13, L14 belonging to the queue L1. Certain of these transactions can result in deadlock in combination with other transactions in other lockout queues. These transactions are designated locking transactions in accordance with the present invention. Certain other transactions will never cause a deadlock, or participate in the occurrence of a deadlock.

The present invention enables it to be shown which transactions in combination with certain other transactions can result in a deadlock situation.

When going through a lockout queue and detecting a locking transaction in the process, this transaction shall be compared with other transactions in other lockout queues in order to evaluate whether these transactions together will constitute a so-called locking transaction combination or a non-locking transaction combination.

Solely the detection of a locking combination will cause further action to be taken in accordance with the invention, for instance action according to what has earlier been described under the heading "Description of the Background Art".

This greatly simplifies the handling of a deadlock risk, since a comparison between several transactions need only be made when a locking transaction has been detected, and further action is only commenced when a locking transaction is detected and when this locking transaction forms a locking combination with some other transaction.

The transactions active in a database can be categorised in different ways, i.e. ways which show whether a transaction can be considered to be a locking transaction or not. A number of such categories will be illustrated in the following description, together with how combinations thereof can provide a simplified procedure in making comparisons between different lockout queues. Combinations of transactions that relate to different categories will be divided into locking and non-looking combinations respectively.

By a locking combination is meant in this description a combination of two transactions which will result in a deadlock if they both request access to one and the same object. By a non-locking combination is meant in this description a combination of two transactions which will not result in a deadlock if they both request access to one and the same object, even when one transaction is a so-called locking transaction, and which combination does not require any further action to be taken.

According to a third embodiment of the present invention, transactions can be divided into simple transactions AT and complex transactions BT respectively, where simple transactions AT are comprised of transactions which solely access one object in the database, and where complex transactions BT comprise transactions that access two or more objects in the database.

As will be seen from FIG. 3, that in this embodiment complex transactions BT constitute so-called locking transactions, that a locking combination, referenced X in the Figures, is comprised of two complex transactions BT (FIG. 3a), and that a non-locking combination, referenced "-" in the Figures, is comprised of a simple transaction AT and some other transaction, regardless of whether this other transaction is a simple transaction AT or a complex transaction BT (FIG. 3b).

According to a second embodiment of the present invention, transactions can be divided into locking transactions CT or writing transactions DT respectively.

It will be understood that by locking transactions is meant non-changing transactions that place a divided lock on objects concerned and that therewith permit other non-changing transactions simultaneous access to said objects, and that by writing transactions is meant changing transactions that place an exclusive lock on the objects concerned and that therewith do not permit any other transaction simultaneous access to the object concerned.

According to the FIG. 4 embodiment, writing transactions DT are so-called locking transactions, a locking combination is comprised of a writing transaction DT and some other transaction, regardless of whether this other transaction is a locking transaction CT or a writing transaction DT (FIG. 4a), and that a non-locking combination is comprised of two reading transactions CT (FIG. 4b).

According to a third proposed embodiment of the present invention, the transactions can be divided into a combination of simple transactions AT and complex transactions BT respectively, and reading transactions CT and writing transactions DT respectively.

As will be apparent from FIG. 5, that in the case of such combinations both complex transactions BT and writing transactions DT form so-called locking transactions, that a locking combination is comprised of a complex writing transaction BDT and a complex transaction BT regardless of whether this latter transaction is a writing transaction DT or a reading transaction CT (FIG. 5a), and that a non-locking combination is comprised of a simple transaction AT, regardless of whether this transaction is a reading transaction CT or a writing transaction DT, and some other transaction, regardless of whether this other transaction is a reading transaction CT, a writing transaction BT, a simple transaction AT or a complex transaction BT (FIG. 5b), or is comprised of two complex reading transactions BCT (FIG. 5c).

According to a fourth proposed embodiment of the present invention, handling of the risk of a deadlock occurring may also include strictly growing transactions that can never cause a deadlock with each other, However, a deadlock may nevertheless occur between mutually non-strictly growing transactions and between a strictly growing transaction and a non-strictly acting transaction.

According to this embodiment, transactions may be divided into strictly growing transactions ET and non-strictly growing transactions FT.

Figures 6A, 6B, 7A, 7B, 7C:
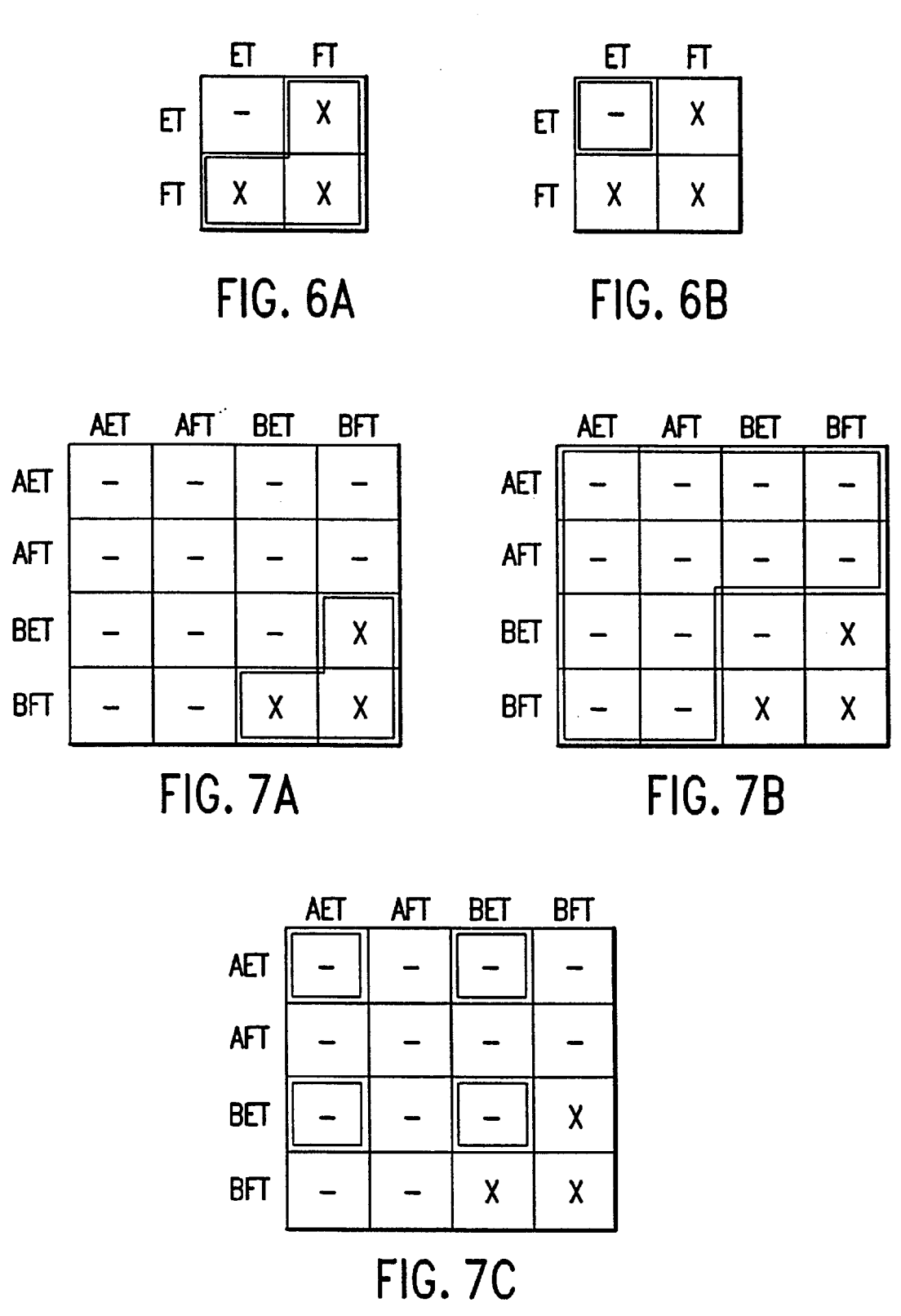

This embodiment is illustrated in FIG. 6, from which it will be seen that non-strictly growing transactions FT form so-called locking transactions, that a locking combination is comprised of a non-strictly growing transaction FT and some other transaction regardless of whether this other transaction is a strictly growing transaction ET or a non-strictly growing transaction FT (FIG. 6a), and that a non-locking combination is comprised of two strictly growing transactions ET (FIG. 6b).

According to a proposed fifth embodiment of the present invention, the transactions may be divided into a combination of strictly growing transactions ET and non-strictly growing transactions FT and simple transactions AT and complex transactions ET respectively.

It will be apparent from FIG. 7 that in such a combination both complex transactions BT and non-strictly growing transactions FT form so-called locking transactions, that a locking combination is comprised of a complex non-strictly growing transaction BFT and a complex transaction BT, regardless of whether this complex transaction BT is a strictly growing transaction ET or a non-strictly growing transaction FT (FIG. 7a), and that a non-locking combination is comprised of a simple transaction AT, regardless of whether it is a strictly growing transaction ET or a non-strictly growing transaction FT, and some other transaction, regardless of whether this other transaction is a simple transaction AT, a complex transaction BT, a strictly growing transaction ET or a non-strictly growing transaction FT (FIG. 7b), or is comprised of two strictly growing transactions ET regardless of whether these are simple or complex transactions (FIG. 7c).

According to a proposed sixth embodiment of the present invention, transaction can be divided into a combination of locking transactions CT and writing transactions DT, and of strictly growing transactions ET and non-strictly growing transactions FT.

It will be apparent from FIG. 8 that writing transactions DT and non-strictly growing transactions FT both form so-called locking transactions, that a locking combination is comprised of a writing non-strictly growing transaction DFT and some other transaction, regardless of whether this other transaction is a reading transaction CT, a writing transaction DT, a strictly growing transaction ST or a non-strictly growing transaction FT (FIG 8a), or is comprised of a writing strictly growing transaction DT and a reading non-strictly growing transaction CFT (FIG 8b), and that a non-locking combination is comprised of two reading transactions CT, regardless of whether these transactions are strictly growing transactions ET or non-strictly growing transactions FT (FIG. 8c), or iq comprised of two strictly growing transactions ET regardless of whether these transactions are locking transactions CT or writing transactions DT (FIG. 8d).

According to a proposed seventh embodiment of the present invention, the transactions may be divided into a combination of simple transactions AT and complex transactions BT respectively, reading transaction CT and writing transactions DT respectively, and strictly growing transactions ET and non-strictly growing transactions FT respectively.

It will be apparent from FIG. 9 that in such a transaction category combination complex transactions BT, writing transactions DT and non-strictly growing transactions FT all form so-called locking transactions, that a locking combination is comprised of a complex writing, non-strictly growing transaction BDFT and a complex transaction BT, regardless of whether this complex transaction is a reading transaction CT, a writing transaction DT, a strictly growing transaction ET or a non-strictly growing transaction FT (FIG. 9a), or is comprised of a complex, writing, strictly growing transaction SDET and a complex reading, non-strictly growing transaction BCFT (FIG. 9b), and that a non-locking combination is comprised of a simple transaction AT in combination with some other transaction regardless of whether this other transaction is a reading transaction CT, a writing transaction DT, a strictly growing transaction ET or a non-strictly growing transaction FT (FIG. 9c), or is comprised of two strictly growing transactions ET regardless of whether these transactions are reading transactions CT, writing transactions DT, simple transactions AT or complex transactions BT (FIG. 9d) or is comprised of two complex reading transactions BCT, regardless of whether these are strictly growing transactions ET or non-strictly growing transactions FT (FIG. 9e).

Simple transactions are not shown in FIG. 9 as strictly growing and non-growing transactions, since these transactions are strictly growing by definition.

It will be obvious to the person skilled in this art that when the transactions can be categorised in accordance with other criteria than those shown here, locking and non-locking combinations can also be formed solely according to such categories or in combination with other categories in accordance with the present invention, and it will be understood that the categories and the category combinations illustrated in this document are only proposed embodiments of the present invention.

With the intention of marking or labelling respective transactions with a category affiliation, it is proposed in accordance with the invention (FIG. 10) to allocate to respective transactions a so-called locking flag 2 which is adapted to show whether or not a transaction can cause a deadlock in combination with another transaction. It will be apparent from the Figure that a transaction 3 can be said, in simple terms, to include a main part 31, a command part 32 and a variable part 33. In the illustrated case, the locking flag 2 is allocated a position in the main part 31 of the transaction.

This locking flag may include different numbers of bits, depending on the category affiliation or affiliations that need to be represented.

When the transactions are divided into simple transactions AT and complex transactions BT, it is proposed in accordance with the invention (according to FIG. 11) that the locking flag 2 includes a first bit 21 which is allocated a first logic value for simple transactions AT and a second logic value for complex transactions BT.

When the transactions are divided into respective reading transactions CT and writing transactions DT, it is proposed in accordance with the invention (FIG. 12) that the locking flag includes a second bit 22 which is allocated a first logic value for reading transactions CT and a second logic value for writing transactions DT.

When the transactions are divided into respective simple transactions AT and complex transactions BT and respective reading transactions CT and writing transactions DT, it is proposed in accordance with the invention (FIG. 13) that the flag includes a first bit 21 and a second bit 22, where the first bit 21 is allocated a first logic value for simple transactions AT and a second logic value for complex transactions BT, and where the second bit 22 is allocated a first logic value for locking transactions CT and a second logic value for writing transactions DT.

When the transactions are divided into respective strictly growing transactions ET and non-strictly growing transactions FT, it is proposed in accordance with the invention (FIG. 14) that the flag includes a third bit 23 which is allocated a first logic value for strictly growing transactions ET and a second logic value for non-strictly growing transactions FT.

When the transactions are divided into respective simple transactions AT and complex transactions BT and into respective strictly growing transactions ET and non-strictly growing transactions FT, it is proposed in accordance with the invention (FIG. 15) that the flag 2 includes a first bit 21 and a third bit 23, where the first bit 21 is allocated a first logic value for simple transactions AT and a second logic value for complex transactions ET, and where the third bit 23 is allocated a first logic value for strictly growing transactions ET and a second logic value for non-strictly growing transactions FT.

When the transactions are divided into respective reading transactions ET and writing transactions DT and respective strictly growing transactions ET and non-strictly growing transactions FT, it is proposed in accordance with the invention (FIG. 16) that the flag will include a second bit 22 and a third bit 23, where the second bit 22 is allocated a first logic value for reading transactions CT and a second logic value for writing transactions DT, and where the third bit 23 is allocated a first logic value for strictly growing transactions ET and a second logic value for non-strictly growing transactions FT.

When the transactions are divided into respective simple transactions AT and complex transactions BT, respective reading transactions CT and writing transactions DT, and respective strictly growing transactions ET and non-strictly growing transactions FT, it is proposed in accordance with the invention (FIG. 17) that the flag will include a first bit 21, a second bit 22 and a third bit 23, where the first bit 21 is allocated a first logic value for simple transactions AT and a second logic value for complex transactions BT, where the second bit 22 is allocated a first logic value for reading transactions CT and a second logic value for writing transactions DT, and where the third bit 23 is allocated a first logic value for strictly growing transactions ET and a second logic value for non-strictly growing transactions FT. FIG. 18 shows the locking flag $2_{T2}$, $2_{T3}$, $2_{T4}$, $2_{T5}$ belonging to the transactions T2, T3, T4, T5 waiting in a lockout queue L1 located in the lockout queue L1, which enables the category affiliation to be seen directly in the queue and that certain waiting transactions need not be compared with other transactions, since certain transactions, such as simple transactions, will never result in a deadlock in accordance with the present invention.

Category affiliation can also be indicated by allotting a plurality of lockout queues for respective objects.

FIG. 9 illustrates an object 03 that has a plurality of different lockout queues L31, L32. T33, . . . , L3n. One transaction T10 has accessed the object 03 and other transactions T11, T12, T13, . . . , T19 wait in different lockout queues, or lines, L31, L32, L33, . . . , L3n to obtain access to the object 03. In this particular embodiment, the number of queues (n) for respective objects is equal to the number of categories of transactions that are active in the database, and the queue affiliation shows the category affiliation of respective transactions T11, T12, T13, , T19.

As earlier described, transactions that belong to the same or different categories may cause a deadlock.

The queue affiliation, or category affiliation, thus shows whether or not a transaction can be considered a locking transaction and whether or not this transaction can cause a deadlock in combination with another transaction.

These categories can include combinations of simple and complax transactions, reading and writing transactions, and/ or strictly growing anid non-strictly growing transactions. It will also be understood that these categories have been given by way of example only and that other characters not mentioned in this description can also be represented through the medium of different lockout queues.

It will also be understood that the invention is not restricted to the aforedescribed and illustrated exemplifying embodiment thereof and that modifications can be made within the scope of the inventive concept as defined in the following claims.

What is claimed is:

1. A method of handling the risk of a deadlock between simultaneous transactions in a database, in which respective objects in said database are allocated at least one lockout queue in which transactions that have requested access to an object are placed and there await the access of a preceding transaction to said object, and in which said handling procedure includes perusing the transactions present in said lockout queues, comprising the steps of providing that a transaction active or ongoing in said database can be categorised as a locking transaction, that a locking transaction can cause a deadlock in combination with one or more other transactions, that combinations of a locking transaction and one or more other transactions are categorised as locking combinations and non-locking combinations respectively, that a non-locking combination never results in a deadlock, that a locking combination can result in a deadlock, that the detection of a locking transaction results in a further perusal of said locking queues, that in said further perusal said locking transaction is compared with transactions that are affiliated to said lockout queues in order to establish whether or not said combination of transactions constitutes a locking or a non-locking combination, and in that solely the detection of a locking combination results in further action.

2. A method according to claim 1, wherein said transactions are divided into simple and complex transactions respectively; in that simple transactions are comprised of transactions that access only one object in the database; in that complex transactions are comprised of transactions that access two or more objects in said database; in that said complex transactions constitute said locking transactions; in that said locking combination is comprised of two complex transactions; and in that said non-locking combination is comprised of a simple transaction and some other transaction, regardless of whether this other transaction is a simple or a complex transaction.

3. A method according to claim 1, wherein said transactions are divided into writing and reading transactions respectively; in that said writing transactions constitute said locking transactions; in that said locking combination is comprised of a writing transaction and some other transaction regardless of whether this other transaction is a reading or writing transaction; and in that said non-locking combination is comprised of two reading transactions.

4. A method according to claim 1, wherein said transactions are divided into simple and complex transactions respectively, and into reading and writing transactions respectively; in that simple transactions are comprised of transactions that solely access one object in said database; in that complex transactions are comprised of transactions that access two or more objects in said database; in that said complex transactions and said writing transactions constitute said locking transactions; in that said locking combination is comprised of a complex writing transaction and a complex transaction regardless of whether this latter transaction is a writing or a reading transaction; and in that said non-locking combination is comprised of a simple transaction regardless of whether this transaction is a reading or a writing transaction, and some other transaction regardless of whether this other transaction is a reading, a writing, a simple or a complex transaction or is comprised of two complex reading transactions.

5. A method according to claim 1 in which strictly growing and non-strictly growing transactions are both active simultaneously in said database, wherein said non-strictly growing transactions constitute said locking transactions; in that said locking combination is comprised of a non-strictly growing transaction and some other transaction, regardless of whether this other transaction is a strictly growing transaction or a non-strictly growing transaction; and in that said non-locking combination is comprised of two strictly growing transactions.

6. A method according to claim 1 in which strictly growing and non-strictly growing transactions are active simultaneously in said database, wherein said transactions are divided into respective simple and complex transactions and into respective strictly growing and non-strictly growing transactions; in that simple transactions are comprised of transactions that solely access one object in said database; in that complex transactions are comprised of transactions that access two or more objects in said database; in that said complex transactions and said non-strictly growing transactions constitute said locking transactions; in that said locking combination is comprised of a complex non-strictly growing transaction and a complex transaction regardless of whether this latter transaction is strictly growing or non-strictly growing; and in that said non-locking combination is comprised of a simple transaction regardless of whether this simple transaction is strictly growing or non-strictly growing, arid some other transaction regardless of whether this other transaction is a simple, complex, strictly growing or non-strictly growing transaction, or two strictly growing transactions regardless of whether they are simple or complex transactions.

7. A method according to claim 1 in which strictly growing and non-strictly growing transactions are active simultaneously in said database, wherein said transactions are divided into reading and writing transactions respectively and into strictly growing and non-strictly growing transactions respectively; in that said writing transactions and said non-strictly growing transactions constitute said locking transactions; in that said locking combination is comprised of a writing, non-strictly growing transaction and some other transaction, regardless of whether this other transaction is a reading, writing, strictly growing or non-strictly growing or writing, strictly growing transaction and a reading non-strictly growing transaction; and in that said non-locking combination is comprised of two reading transactions regardless of whether said transactions are strictly growing or non-strictly growing transactions, or two strictly growing transactions regardless of whether these transactions are reading or writing transactions.

8. A method according to claim 1 in which strictly growing and non-strictly growing transactions are active simultaneously in said database, wherein said transactions are divided into respective simple and complex transactions, into respective reading and writing transactions, and into respectively strictly growing and non-strictly growing transactions; in that simple transactions are comprised of transactions that solely access one object in said database; in that complex transactions are comprised of transactions that access two or more objects in said database; in that said complex transactions, writing transactions and non-strictly growing transactions constitute said locking transactions; in that said locking combination is comprised of a complex writing, non-strictly growing transaction and a complex transaction regardless of whether this transaction is a reading, writing, strictly growing or non-strictly growing or a complex writing, strictly growing transaction and a complex reading, non-strictly growing transaction; and in that said non-locking combination is comprised of a simple transaction in combination with some other transaction regardless of whether this other transaction is a writing, reading, strictly growing or non-strictly growing transaction, or two strictly growing transactions regardless of whether these transactions are locking, writing, simple or complex transactions, or of two complex reading transactions regardless of whether these transactions are strictly growing or non-strictly growing transactions.

9. A method according to claim 1, wherein said transactions are allotted a so-called locking flag; and in that said locking flag is adapted to indicate whether or not said transaction can cause a deadlock in combination with some other transaction.

10. A method according to claim 2 wherein said flag includes a first bit; and in that said first bit is allocated a first logic value for simple transactions and a second logic value for complex transactions.

11. A method according to claim 3, wherein said flag includes a second bit; and in that said second bit is allocated a first logic value for reading transactions and a second logic value for writing transactions.

12. A method according to claim 4, wherein said flag includes a first bit and a second bit; and in that said first bit is allocated a first logic value for simple transactions and a second logic value for complex transactions; and in that said second bit is allocated a first logic value for reading transactions and a second logic value for writing transactions.

13. A method according to claim 5, wherein said flag includes a third bit; and in that said third bit is allocated a first logic value for strictly growing transactions and a second logic value for non-strictly growing transactions.

14. A method according to claim 6, wherein said flag includes a first bit and a third bit; in that said first bit is allocated a first logic value for simple transactions and a second logic value for complex transactions; and in that said third bit is allocated a first logic value for strictly growing transactions and a second logic value for non-strictly growing transactions.

15. A method according to claim 7, wherein said flag includes a second bit and a third bit; in that said second bit is allocated a first logic value for reading transactions and a second logic value for writing transactions; and in that said third bit is allocated a first logic value for strictly growing transactions and a second logic value for non-strictly growing transactions.

16. A method according to claim 8, wherein said flag includes a first bit, a second bit and a third bit; in that said first bit is allocated a first logic value for simple transactions and a second logic value for complex transactions; in that said second bit is allocated a first logic value for reading transactions and a second logic value for writing transactions; and in that said third bit is allocated a first logic value for strictly growing transactions and second logic value for non-strictly growing transactions.

17. A method according to claim 9, wherein said flag is shown in said lockout queue.

18. A method according to claim 1 in which said object is allocated a plurality of lockout queues, wherein the number of lockout queues for respective objects is equal to a number of categories of transactions active in the database, where transactions belonging to the same or different categories cause a deadlock; and in that said queue affiliation or category affiliation indicates whether or not a transaction is able to cause a deadlock in combination with another transaction.

19. A method according to claim 18, wherein said categories include combinations of simple and complex transactions, reading and writing transactions, and/or strictly growing and non-strictly growing transactions respectively.

* * * * *